K. MEEH.
LATCH NEEDLE.
APPLICATION FILED NOV. 25, 1911. RENEWED MAR. 21, 1914.
1,094,737.  Patented Apr. 28, 1914.
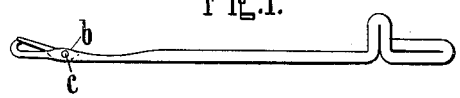
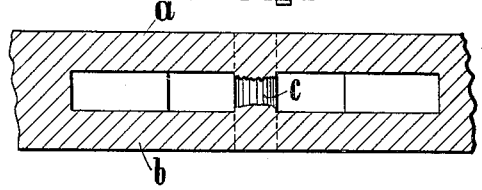
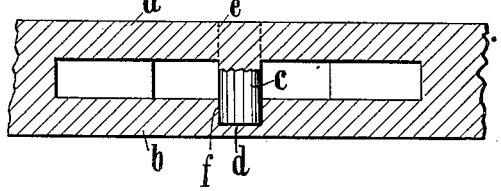

UNITED STATES PATENT OFFICE.

KARL MEEH, OF HOHENSTEIN-ERNSTTHAL, GERMANY.

LATCH-NEEDLE.

1,094,737.  Specification of Letters Patent.  Patented Apr. 28, 1914.

Application filed November 25, 1911, Serial No. 662,462. Renewed March 21, 1914. Serial No. 826,441.

*To all whom it may concern:*

Be it known that I, KARL MEEH, a subject of the German Emperor, and residing at Hohenstein-Ernstthal, Kingdom of Saxony, Germany, have invented certain new and useful Improvements in Latch-Needles, of which the following is a specification.

My invention relates to latch-needles for use in stocking-knitting and knitting machines.

The attempts made heretofore in the well-known latch-needles, for use in stocking-knitting and knitting machines, to weld the pivot-pin into holes bored in the cheeks of the needles have not led to any appreciable tangible results because, whether the welding was done by means of the electric current or by using other means, the welded part was immediately burnt away owing to its extremely small dimensions. The reason of this remained for a long time not clearly explained, but it was finally ascertained that the pivot-pin itself, which up to this time had been made of the same material as the latch-needle, was the cause of the welding operation being unsuccessful.

A primary object of my invention is to provide an improved process of providing latch-needles for stocking-knitting and knitting machines with their pivot-pins, and a further object is to provide improved latch-needles for such machines.

The novel feature of my process consists in providing the needle with a pivot-pin composed of a metal which has a higher melting point than the hard steel used in the manufacture of the needle proper, that is to say with one made of soft steel, wrought iron, nickel or the like, and in welding it into one or both of the two holes opposite one another in the cheeks of the needle.

The invention is illustrated in the accompanying drawing, wherein:—

Figure 1 is a side elevation of a latch-needle, made according to my invention, and Figs. 2 and 3 are horizontal sections, greatly enlarged, showing parts of latch-needles comprising pivot-pins mounted in two different ways.

Referring to the drawing, $a$, $b$ designate two side pieces or cheeks provided with holes for the pivot-pin $c$ of the latch-needle. The pivot-pin $c$ must be composed of a metal softer than the hard steel used in the manufacture of the needle proper, because, as explained above, pivot-pins composed of hard steel cannot be welded into the holes in the cheeks.

In consequence of a soft metal, e. g. wrought iron, being used for the pivot-pin, the welded connection of the pivot-pin to the needle-cheeks can be made in a satisfactory manner. The welding operation is preferably effected by means of electric welding at a point by causing the two electrodes of the welding machine to operate against the two ends of the pivot-pin, whereby the pivot-pin is welded to the needle-cheeks in a very perfect manner.

As shown in Fig. 2, after the welding operation is terminated the ends of the pivot-pin $c$ form one piece, as it were, with the needle-cheeks $a$, $b$ as indicated by the cross-hatching. There is nothing to prevent the length of the pivot-pin $c$ being such at the beginning that the pin does not project out of the holes in the needle-cheeks, so that it is not necessary subsequently to grind down any bur or projecting portion of the pin, this being an additional advantage of my improved process.

In the modification represented in Fig. 3, the pivot-pin $c$ is passed through the hole in the one cheek $a$ so far that its front end enters into a hole or recess in the other cheek $b$ and abuts against the part $d$ of the latter cheek. The other end $e$ of the pin projecting a little out of the cheek $a$ is then welded to this cheek by means of the electric machine for welding at a point. In consequence of the soft metal of which the pivot-pin is composed this welding operation also takes effect at the other end of the pivot-pin, so that the latter is also fixed immovably at $f$. As the two places $d$ and $e$ are simultaneously heated by the electrodes, the pivot-pin is welded directly at one end and indirectly at the other; the weld at the part $d$ of the pin is more or less imperfect, but at the part $e$ it is exceedingly perfect. This mode of mounting the pivot-pin has the advantage that the cheek $d$ does not require to be subsequently ground. The pivot-pin is, however, secured not only in the one cheek, but also in the other cheek of the needle.

I claim:—

1. A latch-needle for use in knitting machines comprising in combination, a needle body composed of hard steel, and having two side pieces or cheeks opposite one another and a hole in each side piece or cheek, and a pivot-pin having both ends welded in the holes of the cheeks, said pivot-pin being composed of a metal having a higher melting point than the hard steel composing the needle body and the side pieces or cheeks of the same.

2. A latch needle for use in knitting machines comprising in combination, a needle body composed of hard steel and having two side pieces or cheeks opposite one another and a hole in each side piece or cheek, and a pivot pin one end of which is welded in the hole of one of the cheeks, the other end of the pin being immovably fixed in the hole of the other side piece or cheek, said pivot-pin being composed of a metal having a higher melting point than the hard steel of the needle body.

3. A latch needle for use in knitting machines comprising in combination, a needle body composed of hard steel and having two side pieces or cheeks opposite one another, one of the side pieces or cheeks being provided with a hole and the other with a recess, and a pivot-pin extending through the hole in one of the cheeks, its front end entering said recess of the other cheek, said pivot-pin being welded in the hole of one of the cheeks and immovably fixed in the recess of the other cheek and being composed of a metal having a higher melting point than the hard steel of which the needle is composed.

In testimony whereof, I affix my signature in the presence of two witnesses.

KARL MEEH.

Witnesses:
SIDNEY RICH,
KURT SINGER.

---

Copies of this patent may be obtained for five cents each, by addressing the "Commissioner of Patents, Washington, D. C."